United States Patent [19]

Ertley

[11] 3,917,429
[45] Nov. 4, 1975

[54] THIN WALL TUBING DEBURRING TOOL
[76] Inventor: Holmes E. Ertley, 33 Indian Place, Altoona, Pa. 16602
[22] Filed: Apr. 11, 1974
[21] Appl. No.: 460,163

[52] U.S. Cl. .................. 408/227; 408/DIG. 714
[51] Int. Cl.² .................................. B23D 77/12
[58] Field of Search ........... 408/211, 212, 194, 199, 408/227, 239, DIG. 714; 30/356, 352; 15/104.18, 104.19, 104.02; 29/90 R

[56] References Cited
UNITED STATES PATENTS

| | | | |
|---|---|---|---|
| 1,685,380 | 9/1928 | Shultz | 15/104.19 |
| 2,450,075 | 9/1948 | Bashara | 408/227 |
| 2,732,612 | 1/1956 | Hallock | 408/227 |
| 3,020,787 | 2/1962 | Cusick | 408/211 X |
| 3,076,254 | 2/1963 | Ricci | 29/90 R |
| 3,078,743 | 2/1963 | Wolfe | 408/714 X |
| 3,445,878 | 5/1969 | Stephens | 15/104.19 X |

Primary Examiner—Frank T. Yost
Assistant Examiner—W. R. Briggs
Attorney, Agent, or Firm—Clarence A. O'Brien; Harvey B. Jacobson

[57] ABSTRACT

A support is provided and at least three elongated slightly bowed and stiff but bendable and resilient stays have one set of corresponding ends anchored to the support at points spaced generally equally outwardly from and circumferentially about a center axis along which the stays extend. The other set of ends of the stays are rigidly anchored together at a point disposed on the center axis and the stays are bowed convexly away from the center axis. The ends of the stays anchored together on the center axis may be wedgingly inserted into one end of a section of thin wall tubing with portions of the stays spaced intermediate their opposite ends engaging spaced inner peripheral portions of the tubing section end in a manner such that relative rotation between the tubing and the tool will cause the outer surfaces of those portions of the stays engaging the inner peripheral portions of the tubing section end to debur the tubing section end. Also, the tool includes at least three additional elongated stays which are also stiff but bendable and resilient and have one set of corresponding ends anchored to the support at points spaced generally equally outwardly from and about the center axis and with the additional stays also generally paralleling the axis. The additional stays are at least slightly divergent toward the other set of corresponding ends thereof with the latter spaced further outwardly from the center axis of the tool than corresponding portions of the first mentioned stays. The outer peripheral portions of a tubing section end may be embracingly engaged between the second set of outwardly divergent stays to debur the outer peripheral surfaces of the tubing section end and one of the outwardly divergent stays includes a finger engageable portion whereby finger pressure may be applied to laterally inwardly displace that one stay whereby a tubing section end being deburred by midportions of the first mentioned stays on its inner periphery may simultaneously be deburred on its outer periphery by the inwardly displaced stay.

7 Claims, 9 Drawing Figures

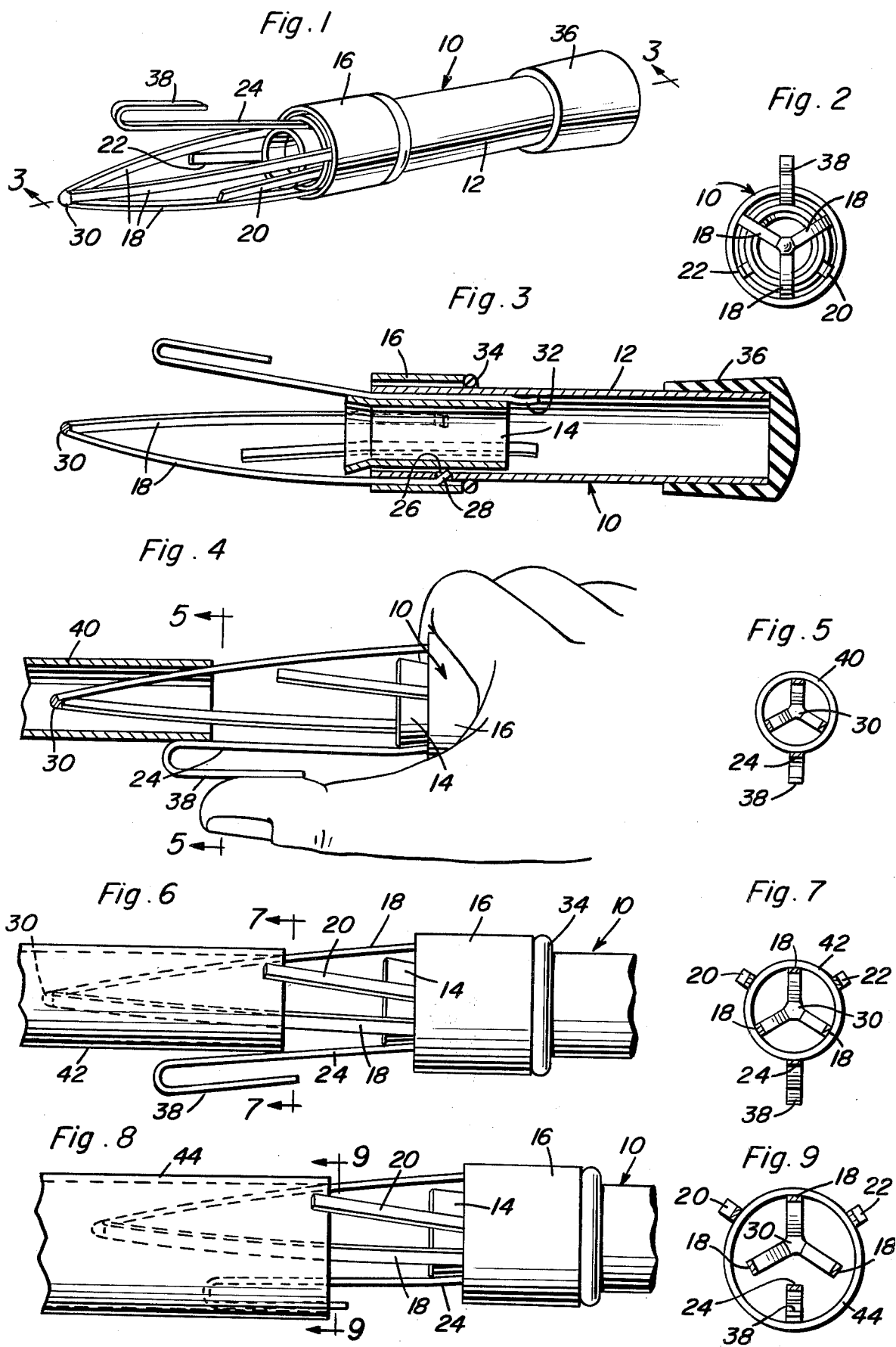

THIN WALL TUBING DEBURRING TOOL

BACKGROUND OF THE INVENTION

Tubing deburring tools which are generally similar in limited respect to the deburring tool of the instant invention have been heretofore used. Examples of such deburring tools are disclosed in U.S. Pat. No. 651,377 to J. McDermott, dated June 12, 1900, U.S. Pat. No. 1,228,951 to G. Y. Morton, dated June 5, 1917 and U.S. Pat. No. 2,242,820 to R. B. Fanslow, dated May 20, 1941. These previously known deburring reaming tools have been provided with either three or four angulated blades spaced about and extending along a center axis with the blades each inclined in generally the same manner relative to the center axis. While these tools are capable of deburring both inner and outer surfaces of tubing sections, when using these tools it is necessary to first debur either the inner surface of a tube section end or the outer surface of a tube section end and to thereafter reverse the tool in position relative to the tubing section in order to debur the other end surfaces. Also, these previous deburring tools are provided with substantially rigid stays or blades with the result that the deburring operation performed on both the inner and outer surfaces of an associated tubing section end may be unevenly performed due to the deburring tool being manually driven.

BRIEF DESCRIPTION OF THE INVENTION

The deburring tool of the instant invention is constructed in a manner whereby both the inner and outer surfaces of a tubing section end may be deburred without reversing the tool relative to the workpiece. Further, the deburring tool is also constructed in a manner whereby the inner and outer surfaces of a tube section end may be simultaneously deburred, within a given working range of the tool. Finally, the cutting blades or stays of the tool are resilient to the extent that they are flexed during operation and thereby compensate for slight errors during manual use of the tool to enable even and accurate deburring of both the inner and outer peripheries of a tubing section end.

The main object of this invention is to provide a deburring tool which may be rapidly used to debur both the inside and outside end surfaces of a tubing section.

Another object of this invention is to provide a deburring tool which may be successively used to debur the inner and outer end surfaces of a tubing section without reversing the tool relative to the workpiece.

Still another object of this invention is to provide a deburring tool which will, within a given working range of the tool, be capable of simultaneously deburring both the inner and outer surfaces of a tubing end.

A further important object of this invention is to provide a deburring tool which may be manually utilized to debur both the inner and outer surfaces of a tubing section end in a manner such that the deburring operation will be performed in a even and controlled manner.

A final object of this invention to be specifically enumerated herein is to provide a hand deburring tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operations as more fully hereinafter described and claimed, reference being had to the accompanying drawings forming a part hereof, wherein like numberals refer to like parts throughout.

FIG. 1 is a perspective view of the deburring tool of the instant invention;

FIG. 2 is an end elevational view of the deburring tool as seen from the left side of FIG. 1;

FIG. 3 is an enlarged longitudinal vertical sectional view taken substantially upon a plane designated by the section line 3—3 of FIG. 1;

FIG. 4 is a side elevational view of the deburring tool in use to simultaneously debur both the inner and outer surfaces of a tubing section end;

FIG. 5 is a vertical sectional view taken substantially upon the plane indicated by the section line 5—5 of FIG. 4;

FIG. 6 is a fragmentary elevational view of the deburring tool in use simultaneously deburring the inner and outer surfaces of a slightly larger diameter tubing section end;

FIG. 7 is a sectional view taken substantially upon the plane indicated by the section line 7—7 of FIG. 6;

FIG. 8 is a fragmentary elevational view of the tool in use simultaneously deburring the inner and outer surfaces of a still larger diameter tubing section end; and FIG. 9 is a vertical sectional view taken substantially upon the plane indicated by the section line 9—9 of FIG. 8.

Referring now more specifically to the drawings, the numeral 10 generally designates the deburring tool of the instant invention. The tool 10 includes three tubing sections 12, 14 and 16 with the tubing section 12 being of an intermediate diameter, the tubing section 14 being of a small diameter and the tubing section 16 being of the largest diameter. Also, the tool 10 includes a first set of three bowed tines 18 and a second set of outer tines 20, 22 and 24.

The tubing section 12 has three evenly circumferentially spaced radial bores 26 formed therethrough adjacent one end of the tubing section 12 and the three inner tines 18 are spaced about the tubing section 12 and include one set of inwardly angulated ends 28 received in the bore 26. The other set of ends of the tines 18 extend endwise outwardly from the end portion of the tubing section 12 in which the bore 26 are formed and the tines 18 are outwardly convex away from the longitudinal center axis of the tube 12 and have their outer ends rigidly joined together as at 30 at a point disposed on the longitudinal axis of the tube 12. One set of ends of the tines 20, 22 and 24 are disposed within the end of the tubing section 12 provided with the bore 26 and spaced equally circumferentially thereabout intermediate adjacent tines 18. The inner ends of the tines 20, 22 and 24 include slightly inwardly deflected bowed terminal ends 32 and the tube section 14 is wedged into the tube section 12 with the ends of the tines 20, 22 and 24 disposed within the tube section 12 clamped between the inner and outer surfaces of the tube sections 12 and 14, respectively. Then, the large diameter tube section is forced over the inner end portions of the tines 18 in a manner covering the angulated terminal ends 28 and the bores 26 and the forward end of the innermost tube section 14 which projects outwardly of the forward end of the tube section 12 is slightly flared in order to frictionally secure the tube sections 12, 14, 16 and the tines 18, 20, 22 and 24 in position relative to each other. An O-ring 34 is telescoped over the tube section 12 immediately rearwardly of the large diameter tube section 16 and a resilient end cap 36 is telescoped over the rear end of the tube section 12.

The flaring of the forward end of the section 14 serves to maintain the forward divergence of the tines 20, 22 and 24 and it will be noted from FIGS. 1 and 3 of the drawings that the tine 24 projects forwardly of the tines 20 and 22 and is provided with an outturned and reversely directed forward terminal end 38 defining a thumb-engageable portion.

After the tool 10 has been assembled the forward ends of the bowed tines 18 may be inserted into the end of a small diameter tube to have its inner periphery deburred. Of course, relative rotation between the tool and the small diameter tube section will cause the inner peripheral surfaces of the associated tube end to be deburred. In addition, if a small, but slightly larger diameter tube section is to have its inner and outer end surfaces deburred, the tool has its tines 18 inserted into the end of the tube section in the manner illustrated in FIG. 4 of the drawings. Then, thumb pressure is applied to the terminal end 38 to inwardly deflect the forward end of the tine 24 whereby the inner surfaces of the tubing section 40 illustrated in FIG. 4 may have its inner and outer end surfaces simultaneously deburred upon relative rotation of the tube section 40 and the tool 10, the outer surfaces of the three tines 18 deburring the inner surfaces of the tube section 40 and the inner surface of the tine 24 deburring the outer end surfaces of the tube section 40.

With attention now invited more specifically to FIG. 6 of the drawings, if an intermediate size diameter tube section 42 is to have its inner and outer surfaces deburred, the tines 18 may be inserted into the tubing section 42 in a manner such that the outer surfaces of the tines 18 will engage the inner periphery of the tubing end and the inner surfaces of the tines 20, 22 and 24 will engage the outer surfaces of the tube section 42. Thus, will all six tines engaged with the tube section 42, the inner and outer end surfaces thereof may be deburred upon relative rotation between the tube section 42 and the tool 10.

With attenion now invited more specifically to FIG. 8 of the drawings, if a large diameter tube end is to be deburred, the tines 18 are inserted into the end of the large diameter tube section 44 as well as the forward end of the tine 24 after having the terminal end portion 38 thereof inwardly deflected sufficiently to be received within the tube section 44. Thereafter, with one of the tines 18 engaged with the inner peripheral surfaces of the tubing section 40 and the two outer tines 20 and 22 engaged with the outer end surfaces of the tube section 44, relative rotation between the tool 10 and the tube section 44 will simultaneously debur the inner and outer surfaces of the tubing section 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A thin wall tubing deburring tool including support means, at least three elongated slightly bowed and stiff but resilient stays having one set of corresponding ends stationarily anchored to said support means at points spaced generally equally outwardly from and circumferentially about a center axis along which said stays extend, the other set of ends of said stays projecting endwise outwardly from said support and being rigidly anchored together at a point disposed on said axis, said stays being bowed slightly convexly away from the center axis, said stays being free intermediate their remote ends for independent flexing, said tool including at least three additional elongated stays spaced outwardly of and extending along said axis, said additional stays also being stiff but resilient, said additional stays having one set of corresponding ends stationarily anchored to said support means at points spaced generally equally outwardly from and about said center axis, said additional stays being at least slightly divergent away from the center axis toward the other set of corresponding ends, the other set of ends of the additional stays being spaced further outwardly from said axis than those portions of the first mentioned stays spaced generally the same distance along said center axis from said support means.

2. The combination of claim 1 wherein said additional stays have said one set of ends thereof anchored to said support at points spaced closer to said center axis than said one set of ends of said bowed stays.

3. The combination of claim 2 wherein one of said additional stays includes a digit engageable outwardly facing free end portion whereby inward pressure may be applied to said outwardly facing portion by one digit of the hand of the user of the tool to inwardly deflect the free end portion of said one additional tine toward said center axis.

4. The combination of claim 3 wherein said outwardly facing free end portion comprises the outwardly facing surface of an out and back turned terminal end portion of said one additional stays.

5. The combination of claim 1 wherein said support means comprises a tubular handle portion from one end of which said stays are supported and which is generally concentric with said center axis.

6. The combination of claim 5 wherein said tubular handle portion includes three relatively telescoped tubular members, said one set of ends of said bowed stays being anchored between the opposing inner and outer surfaces of one pair of adjacent tubular members.

7. The combination of claim 6 wherein said one set of ends of said addtional stays are anchored between the opposing inner and outer surfaces of the other pair of adjacent tubular members.

* * * * *